H. S. BRETTELL.
VEHICLE DIRECTION SIGNAL.
APPLICATION FILED MAR. 7, 1921.
1,403,381.
Patented Jan. 10, 1922.
2 SHEETS—SHEET 1.
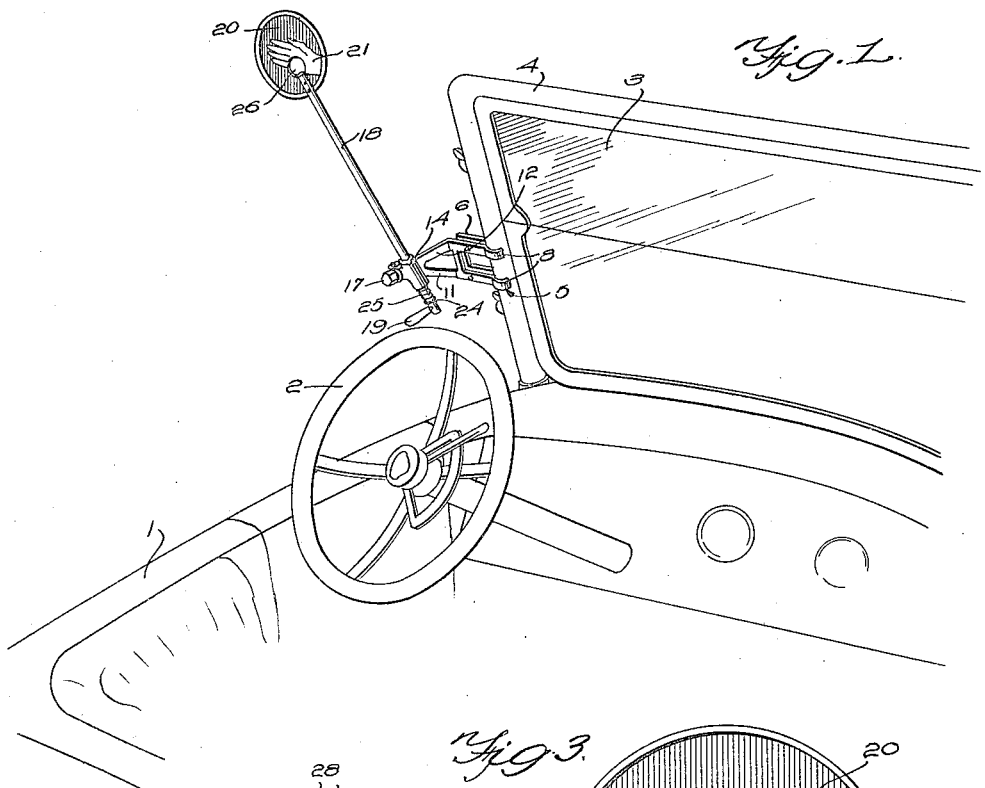
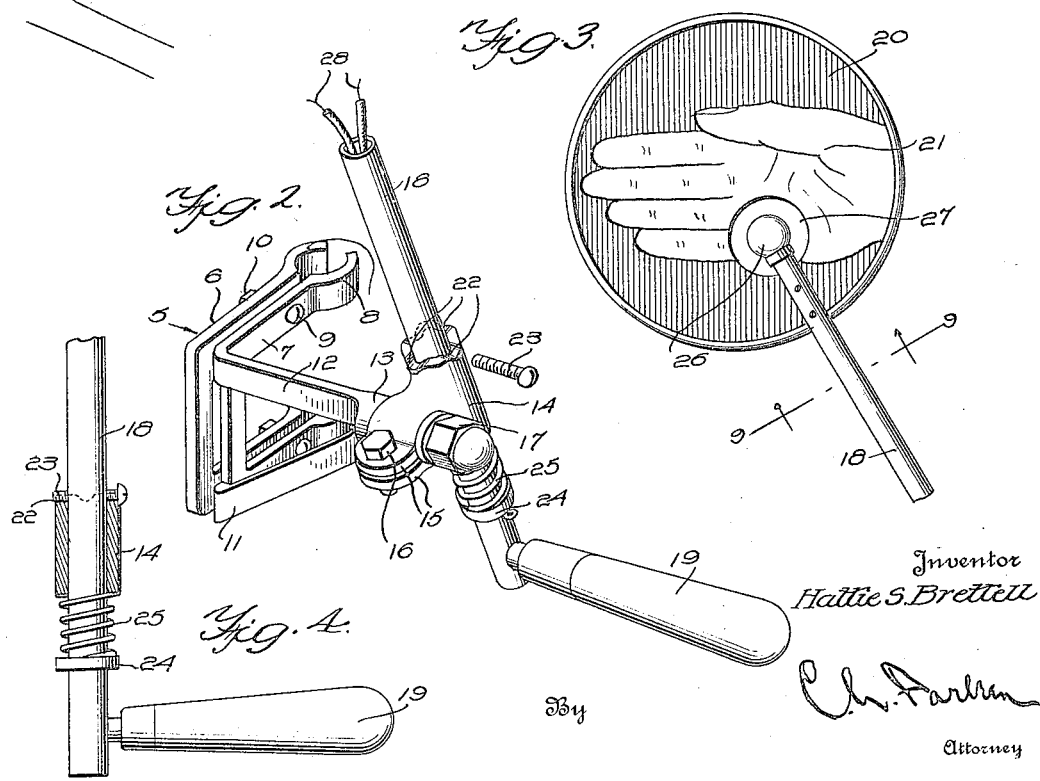
Inventor
Hattie S. Brettell
By
Attorney

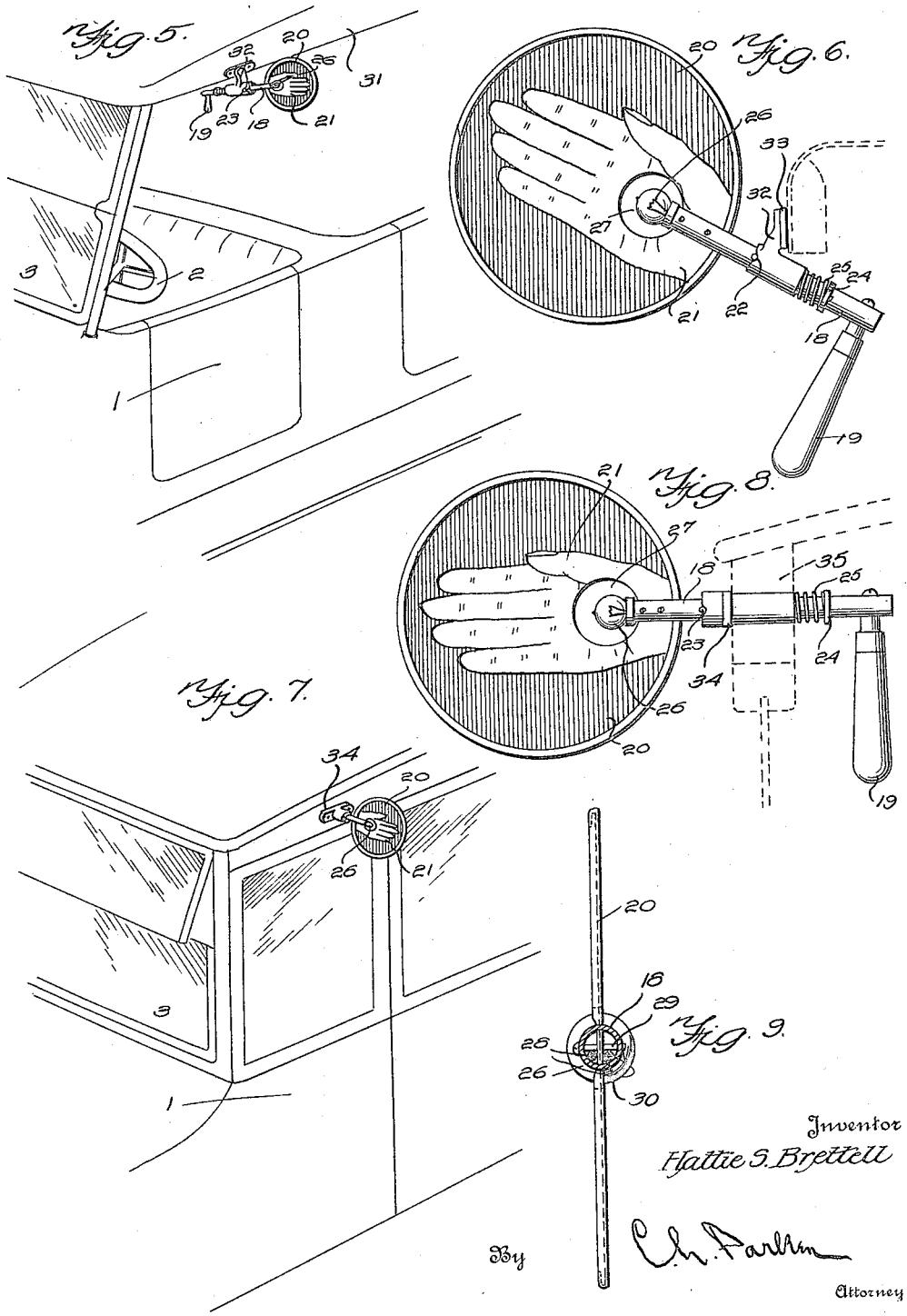

UNITED STATES PATENT OFFICE.

HATTIE S. BRETTELL, OF DENVER, COLORADO.

VEHICLE DIRECTION SIGNAL.

1,403,381.　　　　　Specification of Letters Patent.　　Patented Jan. 10, 1922.

Application filed March 7, 1921. Serial No. 450,270.

*To all whom it may concern:*

Be it known that I, HATTIE S. BRETTELL, a citizen of the United States, residing at Denver, in the county of Denver and State of Colorado, have invented certain new and useful Improvements in Vehicle Direction Signals, of which the following is a specification.

This invention relates to vehicle direction signals, and it comprises a rod or shaft, a signal member arranged on the end of said shaft, an operating handle arranged on the other end of said shaft, a sleeve through which said shaft passes, one end of said sleeve being provided with notches, a pin carried by said shaft, and adapted to engage the end of said sleeve and be received in said notches, and a spring for retaining said pin in said notches.

In the present invention, I have provided a direction signal for vehicles, of simple construction whereby the operator of the machine may give a caution signal when about to stop or make a turn. The device is attached to a suitable portion of the frame of the machine adjacent the driver's seat and is operated by hand.

The signal comprises a rod or arm which is mounted to revolve in a sleeve or bearing. A signal member of any suitable shape may be arranged on the outer end of said rod and when the signal member is turned in one position, it warns the drivers of other vehicles of the intention to stop or turn.

To maintain the signal in either position, the end of the bearing or sleeve is provided with notches arranged at right angles to each other, and a pin or projection is arranged on the shaft or arm and is adapted to be received in said notches. A coil spring is placed around the shaft to maintain the pin in one of the notches and when the device is to be operated, sufficient pressure is applied against the action of the spring to remove the pin from the notch.

A lamp may be arranged in the signal member and lead wires disposed within the shaft or arm to furnish illumination for night driving.

In the accompanying drawings, I have shown several embodiments of the invention. In this showing:

Figure 1 is a perspective view of a portion of an open car, showing the device attached to the windshield frame, Figure 2 is a detail perspective view of the bracket and sleeve showing the shaft or arm to which the signal member is secured, Figure 3 is an elevation of the signal member, Figure 4 is a sectional view through the bearing or sleeve showing the rod or shaft in position, Figure 5 is a perspective view of another form of the invention showing it attached to the top of an open car, Figure 6 is a front elevation of the signal member, the top of the car being shown in dotted lines, Figure 7 is a perspective view of the device applied to a closed car, Figure 8 is an elevation of the form of the invention shown in Figure 7, a portion of the car being shown in dotted lines, and, Figure 9 is a transverse sectional view on line 9—9 of Figure 3.

Referring to Figures 1 to 4 of the drawings, the reference numeral 1 designates generally a motor vehicle having the usual steering wheel 2, and windshield 3. The windshield is provided with a windshield frame 4 of ordinary construction.

When the device is attached to the windshield frame, a bracket 5 is employed comprising a pair of substantially U-shaped members 6 and 7, the ends of the arms of the U-shaped members being curved, as at 8, and adapted to receive the windshield frame. Suitable means are provided for clamping the bracket in position, such as bolts 9 passing through openings in the arms of the U-shaped members and provided with nuts 10. The base of the U-shaped member 7 is provided with a pair of arms 11 and 12, which converge toward each other and are connected to an extension 13. A bearing or sleeve 14 is provided with a pair of ears 15 which are adapted to be arranged around the extension 13 and secured in position by means of a screw or bolt 16. A nut 17 is arranged on the end of the extension to prevent accidental displacement of the sleeve. A rod or shaft 18 extends through the bearing or sleeve, and this rod is provided with an operating handle 19 upon its lower end and a suitable signal member 20 is arranged on the other end of the shaft. As shown, the signal member comprises a circular plate which may be painted any suitable color, as desired, and upon which the representation of a hand 21 may be arranged.

The sleeve 18 is provided with a plurality of notches 22, in one end. Any suitable number of notches may be employed, but as shown, I have provided two pairs of notches, the notches of each pair being diametrically opposite each other, and the notches of one pair being arranged at right angles to the notches of the other pair. A pin or bolt 23 is arranged in an opening in the rod or shaft 18 and projects therefrom on each side, whereby its ends are received in either pair of notches. The shaft is provided with a collar 24, arranged below the sleeve and a coil spring 25 is arranged around this collar, the coil spring being adapted to engage the lower face of the sleeve and the collar to maintain the ends of the pin in either pair of notches.

For the purpose of illuminating the signal at night, a lamp 26 may be arranged in an opening 27 in the signal plate. An electric lamp is preferably employed, and this lamp receives current from a pair of lead wires 28, extending through the tubular rod or shaft 18. Referring to Figure 9 of the drawings, the signal plate is secured to the rod or shaft 18 by means of suitable screws 29. A portion of the plate extends through the rod, as at 30, dividing the interior into four sections. The wires 28 may be arranged between the screws 29 and the portion 30 of the plate to maintain them in proper position.

In Figures 5 and 6 of the drawings, the device is shown applied to the top 31 of a vehicle and the U-shaped bracket 5 is dispensed with. In place of the bracket, the sleeve is provided with an extension 32, connected to a plate 33, which may be secured to the top of the vehicle in any suitable manner. In other respects, the construction is the same.

When the device is to be employed on a closed car, the sleeve is provided with a plate 34 projecting therefrom, as shown in Figures 7 and 8 of the drawings. The sleeve is adapted to be passed through an opening in the upper portion of the side 35 of the car, and the plate 34 secured to the side of the car by suitable fastening means.

When the signal is to be used, it is attached to a vehicle and is normally arranged with the signal plate extending longitudinally of the car. The pin 23 is retained in one of the pairs of notches 22 by means of spring 25, retaining the signal in this position. When the driver of the machine wishes to stop or turn, and desires to give a caution signal to vehicles following him on the road, the handle 19 is grasped, pushed toward the sleeve 14 to overcome the tension of spring 25, and remove the pin 23 from the notches 22. The rod 18 is then revolved a quarter of a revolution and the handle released. The tension of spring 25 will then seat the ends of the pin 23 in the notches and retain the signal plate 20 in a position transversely of the machine, giving a caution signal to the drivers of other machines and to pedestrians. As shown, the spaces between the notches 22 are slightly rounded, whereby the ends of the pin will become seated in the nearest pair of notches when the handle is released and the operator is not required to be extremely careful in turning the rod a quarter of a revolution. When driving at night, the lamp 26 may be illuminated at all times, or a suitable switch may be provided at any convenient point to light the lamp when the signal is to be given.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described my invention, I claim:

1. A direction signal comprising a substantially U-shaped bracket adapted to be secured to a vehicle, a sleeve carried by said bracket, an arm rotatably mounted in said sleeve, a signal member carried by said arm, a light arranged on said signal member, means for rotating said arm, a projection arrangement on said arm intermediate its ends, said sleeve being provided with spaced notches to receive said projection and maintain said arm in different positions, and a coil spring arranged on said arm and engaging said sleeve to normally maintain said pin in one of said notches.

2. A direction signal comprising a bracket, said bracket comprising a pair of U-shaped arms adapted to be arranged side by side, the ends of the arms being curved to permit the bracket to be secured to a support, means for retaining said arms in adjusted position with respect to each other, an extension mounted on one of said arms, a sleeve carried by said extension, an arm rotatably mounted in said sleeve, a signal member carried by said arm, an operating handle secured to said arm, and means for normally holding said arm in predetermined position with respect to said sleeve.

In testimony whereof I affix my signature in presence of two witnesses.

HATTIE S. BRETTELL.

Witnesses:
GEORGE F. BRETTELL,
GEORGE F. CROW.